United States Patent [19]

Atkinson

[11] 4,414,734

[45] Nov. 15, 1983

[54] TRIAD FOR ROCK BIT ASSEMBLY

[75] Inventor: Gerald O. Atkinson, Pasadena, Tex.

[73] Assignee: Hughes Tool Company, Houston, Tex.

[21] Appl. No.: 326,083

[22] Filed: Nov. 30, 1981

[51] Int. Cl.³ .................... B23K 31/00; B23K 37/04; B23Q 3/18

[52] U.S. Cl. ................................. 29/464; 76/108 A; 228/182; 228/212

[58] Field of Search .............................. 228/182, 212; 219/121 ED, 121 LD; 29/559, 464; 76/108 A, 108 R

[56] References Cited

U.S. PATENT DOCUMENTS

| | | | |
|---|---|---|---|
| 2,875,984 | 3/1959 | Goodwin | 255/313 |
| 3,907,191 | 9/1975 | Lichte | 228/182 |
| 4,045,646 | 8/1977 | Lichte | 219/121 |
| 4,098,448 | 7/1978 | Sciaky et al. | 228/102 |
| 4,209,124 | 6/1980 | Baur et al. | 228/182 |

Primary Examiner—Roscoe V. Parker
Attorney, Agent, or Firm—Robert A. Felsman; James E. Bradley

[57] ABSTRACT

A method of assembling sections of an earth boring bit for welding has features to assure precise bit geometry. The method includes a step of providing a hole in each bit section at the centerline of the 120 degree faces on the interiors of the sections. A triad is constructed for use in assembly and consists of three pins joined together on one end, each having an axis 120 degrees apart from the other axes of the pins. The triad is positioned in the holes in the 120 degree faces when the three sections of the bit are brought together. The shank ends of the sections have holes for receiving dowels located in the welding fixture. Once the sections are positioned and pinned against movement at the shank ends and at the triad, the sections are clamped, then welded.

5 Claims, 4 Drawing Figures

TRIAD FOR ROCK BIT ASSEMBLY

BACKGROUND OF THE INVENTION

This invention relates in general to improvements in an earth boring bit assembly, and in particular to a method for assembling and holding drill bit sections in preparation for welding.

One common earth boring bit has three generally conical rotatable cutters. Each cutter is mounted on a bearing pin and rotates about the bearing pin as the bit rotates. The bit is made up of three sections or bit thirds. Each section extends circumferentially 120 degrees and has flat faces on its edges that mate with faces of the two other sections. Each section has a bearing pin that carries one of the cutters.

During manufacturing, each section is first assembled with its cutter. Then the sections are clamped together and welded. A recent technique for welding directs an electron beam against the mating faces of the sections while they are within a vacuum. A continuing problem is in assuring that the gage diameter of the bit is within tolerance, as well as the geometry of the bit body itself.

Prior to electron beam welding, dowel pins were inserted into holes drilled in the 120 degree faces to assure accurate bit geometry. With the advent of electron beam welding of drill bits, various fixtures were proposed, as shown in the following U.S. Patents: 3,907,191, Lichte, Sept. 23, 1975; U.S. Pat. No. 3,987,859, Lichte, Oct. 26, 1976; U.S. Pat. No. 4,045,646, Lichte, Aug. 30, 1977; U.S. Pat. No. 4,098,448, Sciaky et al, July 4, 1978; and U.S. Pat. No. 4,209,124, Baur et al, June 24, 1980.

SUMMARY OF THE INVENTION

In the method of this invention, a hole is drilled in each bit section or third on the inside surface at the centerline of the 120 degree faces. A triad comprising three pins joined together and extending outward from each other at 120 degree angles is provided. Each shank end has a hole drilled in it, and the fixture has three upwardly facing dowels.

During assembly, one pin of the triad is inserted into one of the holes in one of the sections. This section is positioned on the fixture, with its hole in the shank receiving one of the dowels of the fixture. The other sections are placed on the other two dowels of the fixture and brought together so that the other pins of the triad insert into the holes drilled at the centerlines of these sections. The assembled bit is then clamped and welded. The fixture does not have a fixed ring gage.

DESCRIPTION OF THE PREFERRED EMBODIMENT

Figure 1:
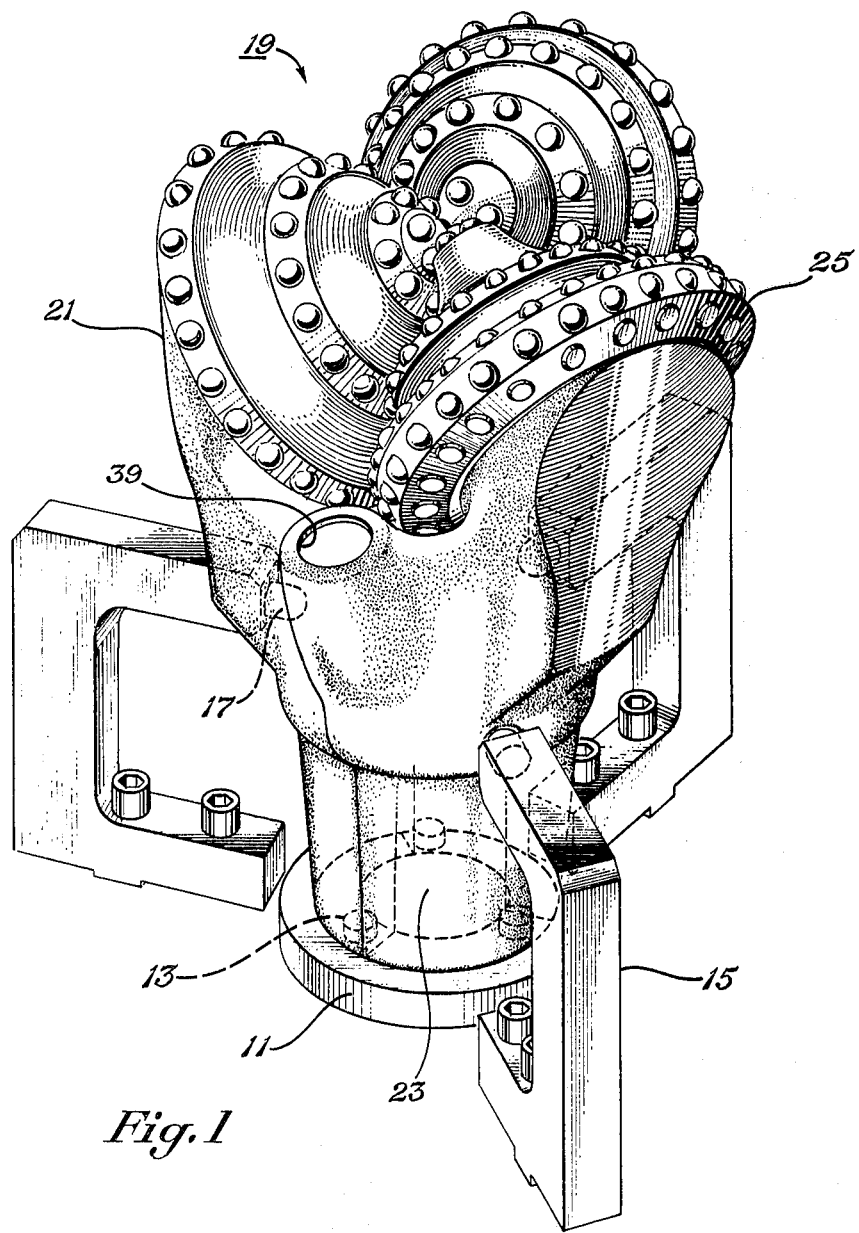
FIG. 1 is a perspective simplified view of a fixture and drill bit positioned for welding in accordance with the method of this invention.

The numeral 11 of FIG. 1 designates the base of a fixture, which has three locator dowels 13 rigidly mounted to it in a circular pattern. Each dowel 13 is at an equal radius from the centerline of the bit axis and spaced 120 degrees from the other dowels. Each dowel 13 is cylindrical. The fixture also has three clamping or chuck jaws 15. Jaws 15 are identical to each other, each spaced-apart 120 degrees. Each jaw has a rigid spherical button 17 that faces radially inward. Jaws 15 are mounted on chucking means (not shown) that indexes the jaws simultaneously inward and outward when actuated by the operator. The fixture is free of any restraints above the tops of buttons 17.

Figure 4:
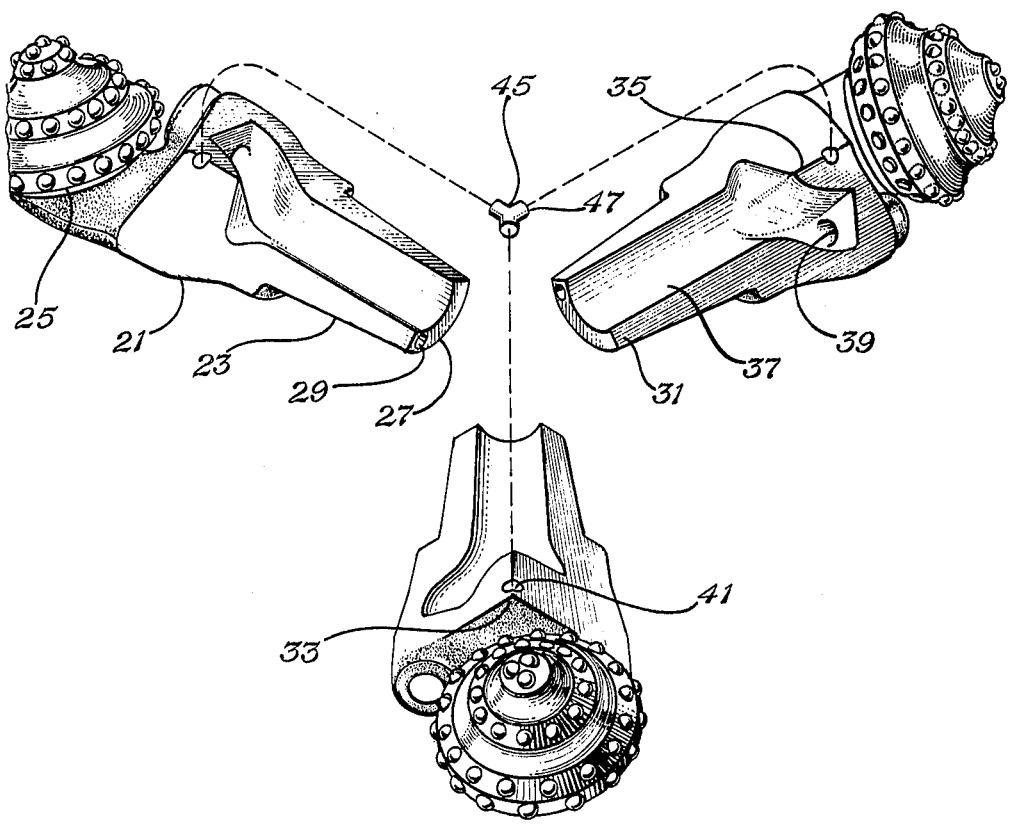
FIG. 4 is an exploded perspective view of the bit sections of the bit of FIG. 1.

The drill bit 19 is made up of three thirds or sections 21. Each section 21 is an irregular shaped member having a shank 23 on one end and rotatable cutters 25 assembled on the other end. When the sections 21 are welded together, the shanks 23 define a frusto-conical surface for being machined into a tapered set of threads (not shown). Referring to FIG. 4, the shank 23 has a shank end 27 that is arcuate and extends 120 degrees. Shank end 27 lies in a plane perpendicular to the axis of the bit and has a dowel hole 29 drilled in it parallel with the axis of the bit. Dowel hole 29 is cylindrical and of a diameter for closely receiving one of the dowels 13 (FIG. 1). Dowel hole 29 is not located in the center of the shank end, rather is offset to one side of the center, preferably close to one edge of shank end 27.

Each section 23 has two faces 31 formed in it prior to assembly. Faces 31 extend from the crotch 33 to the shank end 27. Faces 31 are flat and intersect each other at 120 degrees. A 120 degree corner, termed herein centerline 35, is located at the intersection of the faces 31. Centerline 35 extends from the crotch 33 to a cavity 37. Cavity 37 is a channel that extends axially down each section 21 to mate with the other sections to define an axial bore for the transmission of drilling fluid. One end of cavity 37 inclines and terminates in a smaller nozzle passage 39 for discharging the drilling fluid. Faces 31 extend on both sides of channel 37 and intersect each other at centerline 35 on the upper end of channel 37. The terms "upper" and "lower" as used herein refer to the position of the bit 19 when mounted in the welding fixture, as shown in FIG. 1.

A triad hole 41 is drilled in each centerline 35. Triad hole 41 is cylindrical and has an axis located on a radial line of the axis of the assembled drill bit 19. The axis of hole 41 equally bisects the section 21, thus is at a 60 degree angle with respect to each face 31. Hole 41 intersects the axis of the assembled drill bit 19 at a 90 degree angle.

Figure 2:
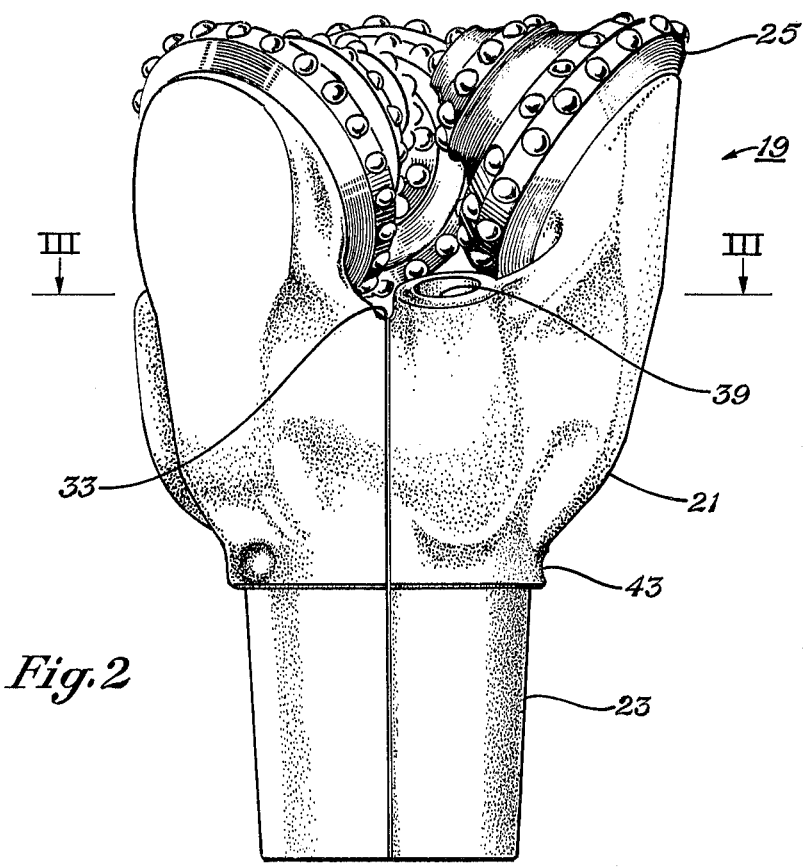
FIG. 2 is a side elevational view of the drill bit of FIG. 1.

Referring to FIG. 2, the outer surface of each section 21 has a concave depression 43 machined in it after forging. Depression 43 is smooth and is located immediately above shank 23 in a cylindrical portion of section 21. Circumferentially, depression 43 is at equal distances from each face 31 of section 21 and the bottom of depression 43 is located from centerline 35. Depression 43 is located below the triad hole 41 (FIG. 4) when the bit is oriented with the shank end 27 down as shown in FIG. 2.

Referring again to FIG. 4, a locking member or triad 45 is constructed for use in positioning the sections 21 for welding. Triad 45 is a union of three cylindrical pins 47. Pins 47 are cylindrical, and each has an axis that intersects the axes of the other pins. The axes of the pins 47 are spaced 120 degrees apart. The intersection of the axes of the pins 47 coincides with the axis of bit 19 when assembled. The axes of pins 47 are perpendicular to the axis of bit 19 when assembled. The diameters of the pins 47 are identical, as is their lengths, for close reception in the triad holes 41.

In manufacturing the bit, first the bit sections 21 are forged in their general configuration, including the channel 37. Then the faces 31 are machined smooth and flat so that a centerline 35 is provided of the proper 120 degree angle. The triad hole 41 and the dowel hole 29 are drilled in each section 21. Depressions 43 are machined. Cutters 25 are assembled on the bearing pins (not shown) of each section 21.

Figure 3:
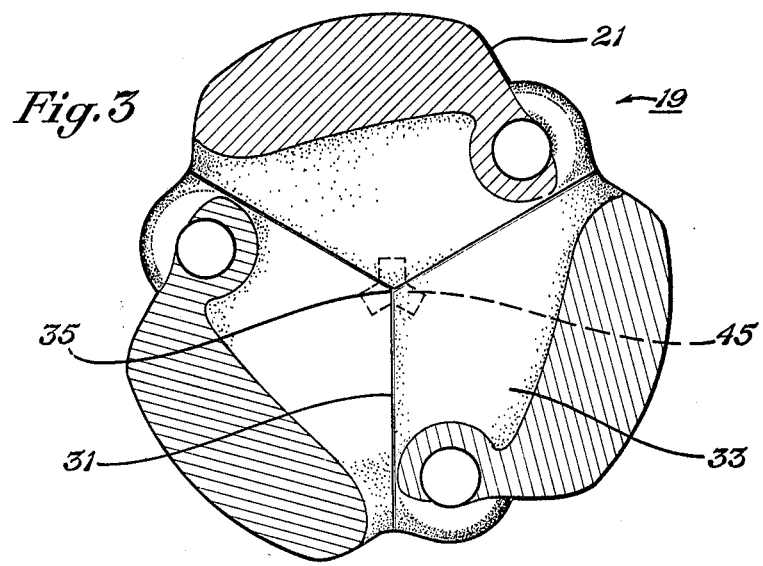
FIG. 3 is a sectional view of the drill bit of FIG. 1, taken along the line III—III of FIG. 2.

To assemble the sections 21 for welding, one of the sections 21 is placed on fixture base 11, with dowel 13 in dowel hole 29. One pin 47 of triad 45 is inserted in triad hole 41 either before or after positioning section 21 on the fixture base 11. A second section 21 is then placed on fixture base 11, with its dowel hole 29 registering with dowel 13. The second section 21 is pushed toward the other section 21 until another pin 47 of triad 45 inserts into the triad hole 41 of the second section 21, and dowel 13 inserts into dowel hole 29. A third section 21 is placed on fixture base 11, with its dowel hole 29 receiving dowel 13. The third section 21 is pivoted about dowel 13 to receive the last pin 47 of triad 45 in its triad hole 41. FIG. 3 shows this position, with the faces 31 in contact with each other, and with the triad 45 located immediately below crotch 33 on the axis of bit 19. The dowel holes 29 serve as positioner means and the dowels 13 serve as mating means for positioning the shank ends 27 on the fixture base 11.

Then the chucking means is actuated to bring the jaws 15 radially inward. The button 17 will mate with the depressions 43 and exert inward radial forces. The dowels 13 will prevent any translational movement of the shank ends 27 with respect to dowels 13. The triad 45 will prevent any skewing or scissoring of the faces 31 of mating sections 21, thus assuring design integrity of the bit body. There will be no restraints at any point above the contact of jaws 15, which is below the triad. The diameter of the bit will be checked by inserting a gage ring over the cutters and measuring at the cutters, however, this gage ring will be removed prior to welding. The sections will not be skewed and scissored to achieve a proper diameter if it is out of tolerance.

Once clamped, the bit is moved into a vacuum chamber of an electron beam welding unit for welding. When welding, a beam is directed at the bit along the faces 31 to weld the sections 21 together. After welding, the bit is removed from the fixture, and further operations are conducted, such as machining threads on the shanks 23. The triad 45 will be permanently welded within the bit.

The invention has significant advantages. Use of the positioner means on the shank ends plus the triad assures accurate bit geometry. The depression on the outer surface and the button on the chucking jaws reduces the chances of nonradial forces being exerted due to irregularities in the outer surface of the sections. The triad adds little expense or time to the conventional assembly of the bits. The chance for operator error in assembling the bit is lessened by the use of the triad, as well.

While the invention has been shown in only one of its forms, it should be apparent to those skilled in the art that it is not so limited but is susceptible to various changes and modifications without departing from the spirit of the invention.

I claim:

1. A method of positioning bit sections for welding, each section having faces intersecting each other at 120 degrees to provide a centerline, comprising:
   providing a hole in each bit section at the centerline; and
   providing a locking member having three pins joined together at a common point;
   inserting each pin of the locking member into one of the holes and clamping the sections together.

2. A method of positioning bit sections of a rolling cutter drill bit for welding, each section having two faces on its interior that intersect each other at 120 degrees at a centerline, comprising:
   drilling a hole into each section at the centerline and on an axis that equally bisects the section;
   providing a triad comprising a union of three pins, each with an axis intersecting the axes of the other pins at 120 degrees and in a common plane;
   inserting one of the pins of the triad into the hole of one of the sections;
   placing the sections on a fixture and bringing the sections together to cause the other pins of the triad to enter the other holes of the sections; and
   clamping the sections together by exerting a radial force on each section at a point no higher than the triad, while allowing the portions of the sections above the triad to locate freely without any external restraints.

3. A method of positioning bit sections on a fixture for welding, each section having two faces on its interior that intersect each other at 120 degree at a centerline, each section having a shank terminating in a shank end, the method comprising in combination:
   drilling a triad hole in each section at the centerline of the faces;
   forming positioner means operable on the shank ends of the sections to be welded;
   providing a triad comprising a union of three equally intersecting pins;
   inserting one pin of the triad into the triad hole of one of the sections;
   locating the positioner means of each section on a mating means of the fixture to establish the relative positions of the shank ends, and bringing the sections together to cause the pins of the triad to enter the triad holes of the other sections; then
   clamping the sections together.

4. In a method of assembling a rolling cutter drill bit having three bit sections, each section having faces intersecting at a centerline at 120 degrees, and a shank terminating in a shank end, the method including locating for welding the assembled bit sections on dowels extending from the fixture into dowel holes drilled in the shank ends, the improvement comprising:
   drilling a triad hole in each section at the centerline of the faces and on an axis that equally bisects the section;
   providing a triad comprising a union of three pins, each pin having an axis intersecting the axes of the other pins at 120 degrees and in a common plane; and
   inserting the triad into the triad holes and clamping the sections together with the dowels in the dowel holes.

5. A method of positioning bit sections of a rolling cutter drill bit on a fixture for welding, each section having faces intersecting each other at a centerline at 120 degrees, and a shank terminating in a shank end, the method comprising in combination:

drilling a triad hole in each bit third at the centerline at the faces and on an axis that equally bisects the bit section;

providing a triad comprising a union of three pins joined 120 degrees apart from each other;

drilling a cylindrical dowel hole in each shank end offset from the center of the shank end and near the edge of the shank end;

forming a concave depression in the outer surface of each section immediately above the shank and below the triad hole;

inserting one pin of the triad into the triad hole of one of the sections;

locating the dowel hole of each section on a dowel in the fixture and bringing the sections together to cause the other pins of the triad to enter the other triad holes; and clamping the sections together by directing radial inward forces on the sections with a chucking jaw for each section, each chucking jaw having a button that mates with the depression.

* * * * *